US006594144B1

(12) United States Patent  (10) Patent No.: US 6,594,144 B1
Miles  (45) Date of Patent: Jul. 15, 2003

(54) MONITOR FRAME APPARATUS

(76) Inventor: Gwendolyn A. Miles, 5002 Alcott St., Dallas, TX (US) 75206-6610

( * ) Notice: Subject to any disclaimer, the term of this patent is extended or adjusted under 35 U.S.C. 154(b) by 185 days.

(21) Appl. No.: 09/827,120

(22) Filed: Apr. 5, 2001

(51) Int. Cl.[7] .............................. G06F 1/16; H04N 5/64
(52) U.S. Cl. .................... 361/681; 361/682; 312/7.2; 312/234; D14/449; 248/924; 248/441.1
(58) Field of Search ................. 361/681–683, 361/679; 312/223.1–223.3, 7.2, 234; 248/918–924, 244.1–265.1

(56) References Cited

U.S. PATENT DOCUMENTS

| | | | | | |
|---|---|---|---|---|---|
| 3,733,436 | A | * | 5/1973 | Rose | D14/449 |
| 4,869,565 | A | * | 9/1989 | Bachman | 312/234 |
| 5,082,235 | A | * | 1/1992 | Crowther et al. | 248/918 |
| 5,101,298 | A | * | 3/1992 | Lentz et al. | 348/842 |
| 5,218,474 | A | * | 6/1993 | Kirschner | D14/450 |
| 5,432,504 | A | * | 7/1995 | Shaw et al. | D14/331 |
| 5,564,209 | A | * | 10/1996 | Zagnoli | 248/918 |
| 5,717,566 | A | * | 2/1998 | Tao | 361/681 |
| 5,905,546 | A | * | 5/1999 | Giulie et al. | 348/842 |
| 5,997,145 | A | * | 12/1999 | Mora | 348/842 |
| 6,170,791 | B1 | * | 1/2001 | Pitcher et al. | 248/441.1 |
| 6,188,450 | B1 | * | 2/2001 | Coons | 348/841 |
| 2002/0096979 | A1 | * | 7/2002 | Johnson | 312/205 |

FOREIGN PATENT DOCUMENTS

DE 004443987 C1 * 1/1996 ............. G06F/1/16

* cited by examiner

Primary Examiner—Darren Schuberg
Assistant Examiner—Lisa Lea-Edmonds
(74) Attorney, Agent, or Firm—Garvey, Smith, Nehrbass & Doody, L.L.C.; Charles C. Garvey, Jr.

(57) ABSTRACT

A monitor framing apparatus is provided for enhancing a monitor that includes a screen surrounded by a front face portion of the monitor. The apparatus includes a plurality of frame sections, including top, left and right side sections, and a bottom section. Each section provides a pair of panels connected at a fold, score, or seam. One of the panels of each pair is a panel that registers against and covers at least a portion of the front face of the monitor. A plurality of attachments, preferably slots are provided on at least one of the frame sections. These slots enable a clipboard panel or like panel to be attached to a selected frame section for supporting documents, photographs or other items at a position spaced to the right of and/or to the left of the monitor screen.

32 Claims, 4 Drawing Sheets

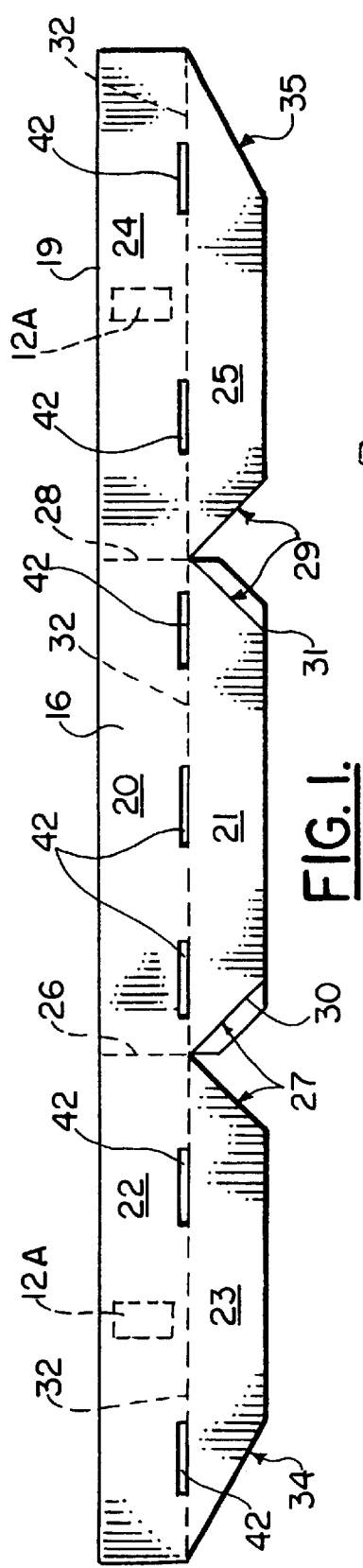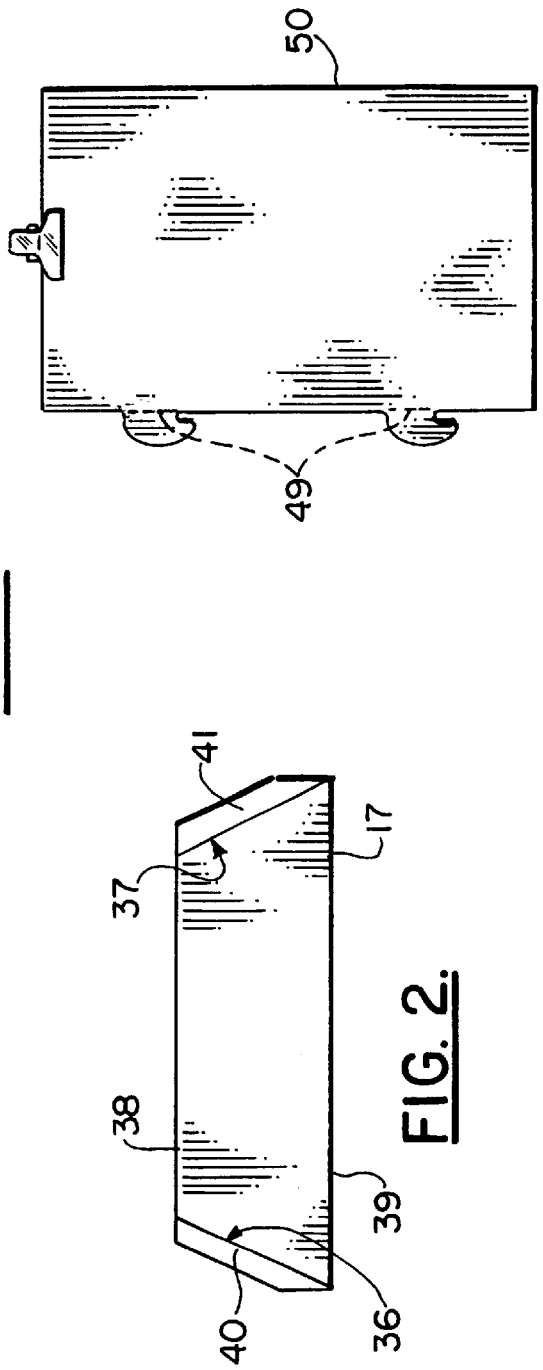

MONITOR FRAME APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to computer and television monitors and more particularly, to an improved custom-fit framing arrangement for providing an adjustable, colored, decorated, textured, and/or stenciled frame attachable to a monitor and covering the front face portion of the monitor and at least part of one or more of the monitor's perimeter sides, surrounding the screen.

2. General Background of the Invention

Personal computers are usually accompanied by a common monitor peripheral that is typically gray, white, tan or black in color. These monitors are frequently operated by an individual at his or her workplace for many hours a day. The bland, nondescript coloration of these monitors generates a degree of boredom for the user, limits interior decorating options, and does not provide any fitting or other place to attach logos, photographs, operator keepsakes, or storage for frequently used office tools which can improve worker efficiency or attaching other items meeting individual user requirements.

Television monitors are also typically neutral in color and do not include a place to attach remote control units and/or manuals or guides, nor do television monitors have a surface facilitating the use of markers such as dry erase.

BRIEF SUMMARY OF THE INVENTION

The present invention provides a monitor framing apparatus enabling a user to decorate a monitor that includes a screen with a front face portion. The present invention can be used on monitors with or without a chassis.

The apparatus includes a plurality of preferably three foldable frame sections that include top, and left and right side sections. A bottom section is a generally flat section that is connectable to the other three sections. The bottom panel enables a perfect fit to be made to any monitor because its position relative to the other three can be changed simply by moving it up and down until the desired location is achieved and then fastening it to the assembly of the other three sections.

Each of the upper and side sections is preferably in the form of a pair of panels that connect at a fold, score, seam, or cut-line. The bottom panel is preferably flat but for its adhesive tabs.

One of the panels of each of the pairs of panels for the top and side sections registers against and covers (at least in part) the front face of the monitor. The bottom section then attaches to the other three sections. During use, the panels of a particular top/side frame section are folded and oriented at about ninety degrees with respect to each other. The bottom section can be flat and without folds.

A plurality of attachments are provided on the frame section or sections, such as, for example on the left, right, or top frame section.

The bottom frame section can be provided in a trapezoid shape. The bottom section forms a connection between the bottom of the left frame section and the bottom of the right frame section. The sections can be provided as separate units that are affixed together using adhesive, scored tabs provided at the ends of certain of the sections.

One or more panels such as a clipboard panel(s) can be provided that removably attaches to one or more of the frame sections at the attachment slots. The clipboard panel can, for example, provide tabs that fit into and attach to the slots for holding the panel or clipboard panel on either the right or left side of the computer monitor.

This panel or clipboard panel can be used to support documents, photographs or any other items selected by a user. Two panels can be provided to function as doors or a dust cover for the screen. Alternatively, the slots can be provided for attaching other tabbed items which include, but are not limited to, photographs, pen holders, office tools, work notes, cards, art work, operator name, or logo information. Alternatively, some items may be attached to the side and front panels with hook and loop (eg. Velcro) or like fasteners.

The top section can be manufactured in various widths to fit the width of virtually any monitor. The side sections can be trimmed to fit the height of any monitor (see FIGS. 8–9). The bottom section can be provided in various widths. The top and bottom sections can be provided for example in various widths of one half inch increments. Thus, for a monitor that is 16½ inches wide, a 17 inch "kit" would be purchased.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a partial plan view of a portion of the preferred embodiment of the apparatus of the present invention showing the top and side panels in an unfolded, flat condition;

FIG. 2 is a partial plan view of the bottom portion of the preferred embodiment of the apparatus of the present invention;

FIG. 3 is a fragmentary elevation view showing a clipboard portion of the preferred embodiment of the apparatus of the present invention;

DETAILED DESCRIPTION OF THE INVENTION

Figure 4:
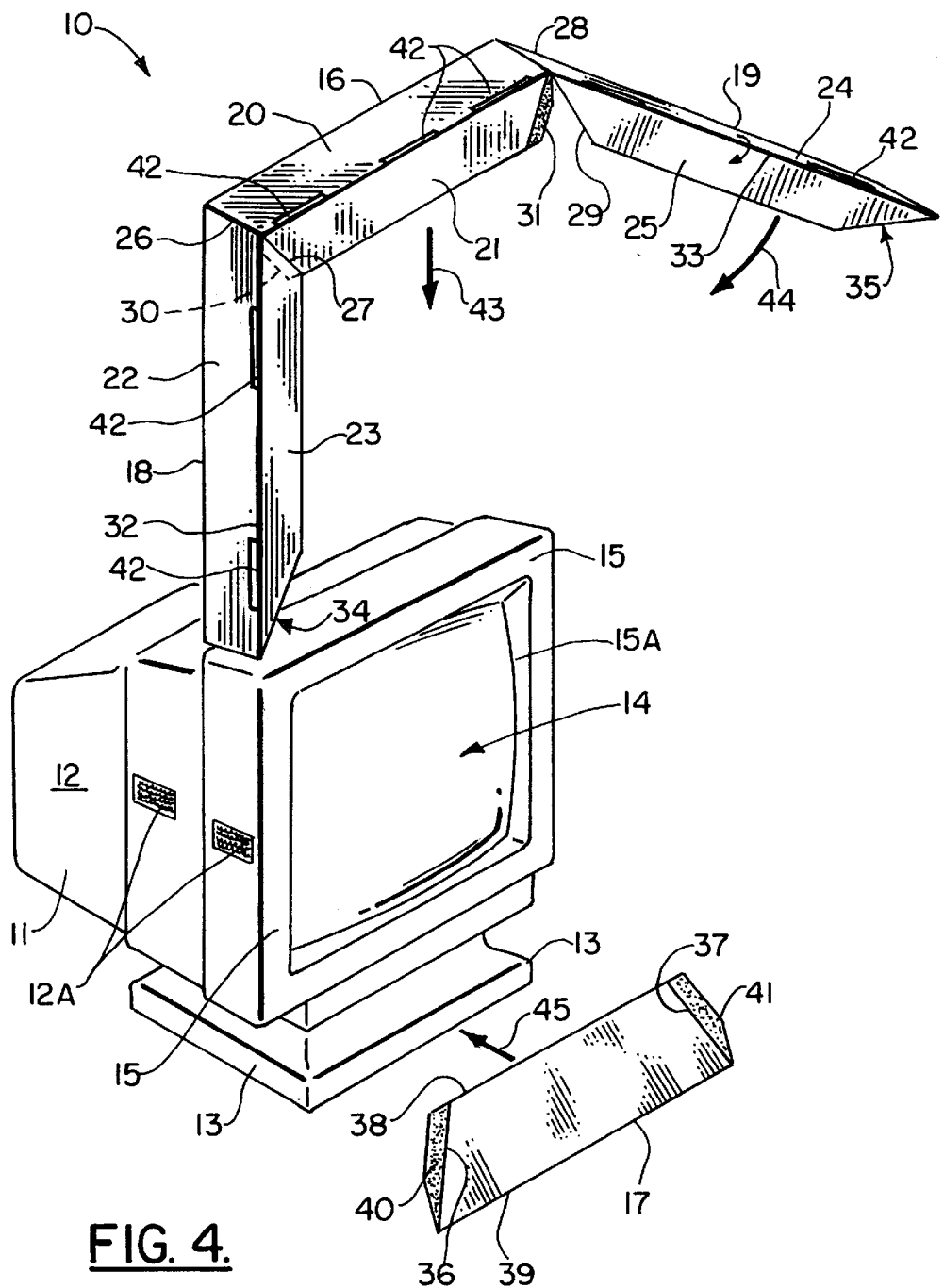
FIG. 4 is a perspective exploded view of the preferred embodiment of the apparatus of the present inventions.
Figure 5:
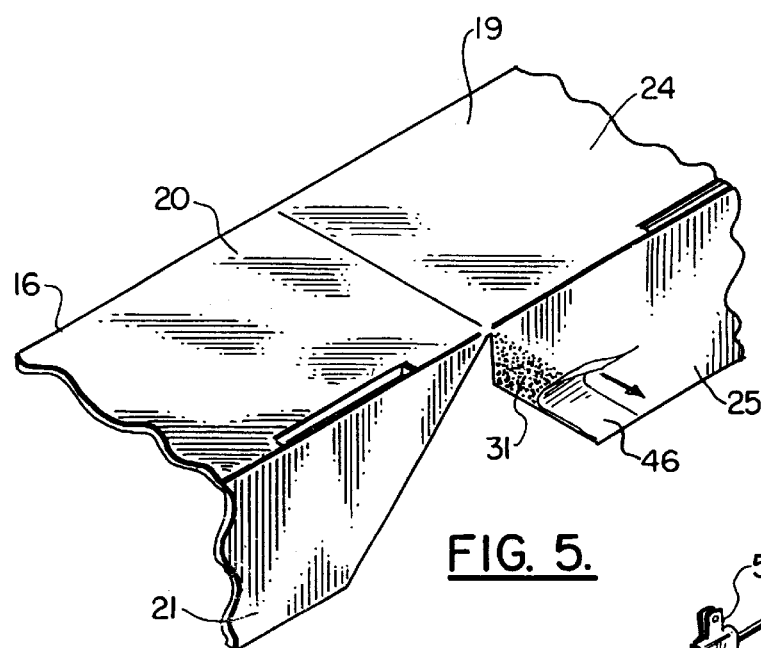
FIG. 5 is a fragmentary perspective view of the preferred embodiment of the apparatus of the present invention.
Figure 6:
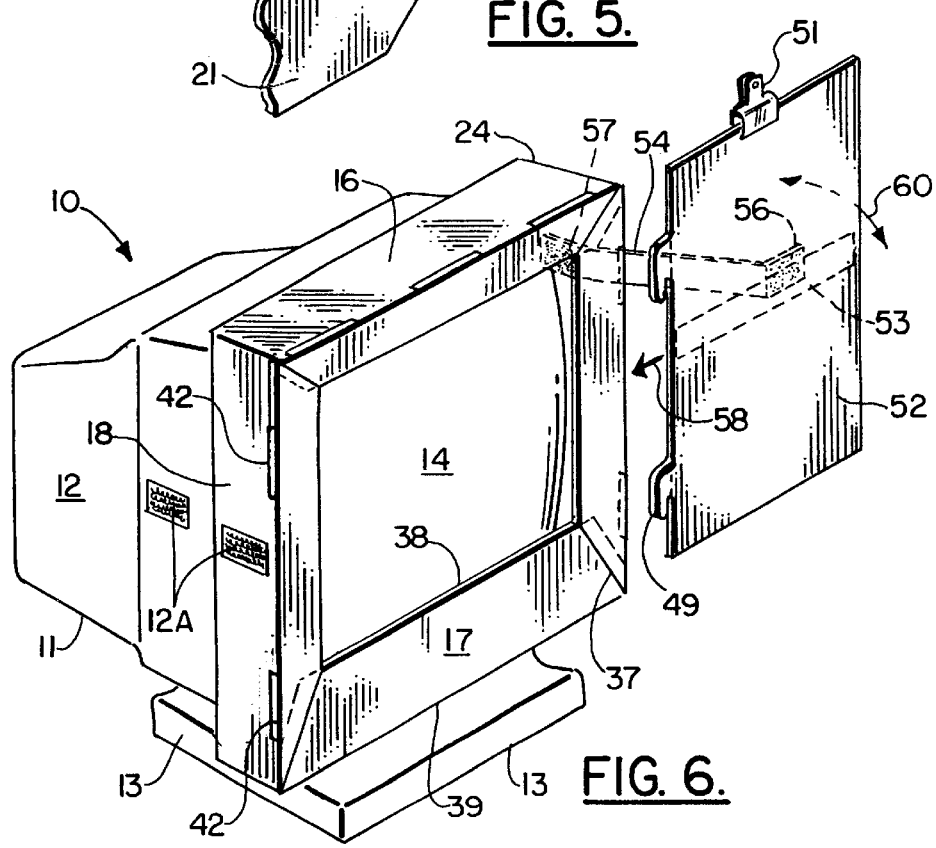
FIG. 6 is a perspective view of the preferred embodiment of the apparatus of the present invention.

FIGS. 1–6 show the preferred embodiment of the apparatus of the present invention designated shown by the numeral 10 in FIGS. 4 and 6. Monitor framing device 10 is shown in FIGS. 4 and 6 attached to a common computer or television monitor 11. The monitor 11 typically provides a chassis which can be metal, plastic or other durable material. The chassis 12 can include a foot 13. The foot 13 is used to support the monitor 11 upon a flat surface such as a work table. Typically, the chassis 12 can articulate with respect to the foot 13 so that the screen 14 can be adjusted depending upon the user's height and preferred angle of viewing.

A front face 15 of monitor 11 provides a generally flat peripheral surface with inwardly angled portion 15A both surrounding screen 14. This front face 15 as well as the entire chassis 12 and foot 13 are typically, of a single color such as white, tan, grey or black.

The present invention provides a monitor framing device 10 that enhances the visual appeal of the monitor 11 and at the same time provides a means for a user to attach logos; pictures, decorations, coloration, and/or add texture. In FIGS. 1–3, monitor framing device 10 is comprised of a number of sections including upper horizontal section 16, lower horizontal section 17, left side section 18 and right section 19. As shown in FIG. 1, the upper horizontal section 16 is comprised of a horizontal top panel 20 and an inclined front panel 21. The left side section 18 is comprised of a side panel 22 and front panel 23. The right section 19 is comprised of a side panel 24 and front panel 25. Fold 26 is provided in between horizontal top panel 20 and side panel 22. Fold 28 is provided in between horizontal top panel 20 and side panel 24. Upon assembly, a seam 27 is provided when inclined front panel 21 is joined to front panel 23. In order to construct the seam 27, an adhesive tab 30 is provided as shown in FIGS. 1 and 4. The adhesive tab 30 can be covered with a release liner until assembly is required.. Likewise, a seam 29 is provided in between the inclined front panel 21 and the front panel 25. The seam 29 can be constructed using adhesive tab 31. As with the adhesive tab 30, adhesive tab 31 can be provided with a release liner that is to be removed when the frame device 10 is to be assembled and applied to a monitor 11.

Fold 32 is provided in between side panel 22 and front panel 23. A fold 32 is also provided in between side panel 24 and front panel 25. Each of the panels 23, 25 provides a mitered edge that meets with a similar mitered edge 36, 37 of lower horizontal section 17. An adhesive tab can be provided at each of the mitered edges 36, 37 of the lower horizontal section 17, forming seams of like kind as top corners 26, 28. In FIGS. 2 and 4 there can be seen adhesive tab 40 next to mitered edge 36 and adhesive tab 41 next to mitered edge 37. In order to assemble lower horizontal section 17 to the combination of sections 16, 18, 19 (FIG. 1) the release liner is removed from each of the adhesive tabs 40, 41 and the mitered edge 36 is aligned with the mitered edge 34. At the same time, the mitered edge 37 is aligned with the mitered edge 35. The adhesive tabs 40, 41 then hold lower horizontal section 17 to the combination of sections 16, 18, 19 (see FIG. 4).

The lower horizontal section 17 provides upper edge 38 and lower edge 39. The upper edge 38 registering with the bottom of screen 14 as shown in FIG. 6. A plurality of slots 42 are provided on each of the sections 16, 18, 19. In FIG. 1, a pair of slots 42 are provided in each of the sections 16, 18, 19. As shown in FIG. 1, the slots 42 can be provided at the folds 32.

In each of the embodiments, the side panels, front panel and bottom section can be constructed so that they are oriented to angle inwardly toward screen 14.

FIG. 4 illustrates an assembly of monitor framing device 10 to monitor 11. As indicated by arrow 43, the upper horizontal section 16 is placed upon the top of the monitor 11. Inclined front panel 21 registers against and covers a portion of front face 15 of monitor 11. Side panel 22 and side panel 24 register against the sides of the monitor 11 as shown in FIG. 6. Arrow 44 indicates that each of the side sections 18, 19 is rotated until the panels 22, 24 fit against the sides of the monitor 11 with the panels 23,25 each covering at least a portion of front face 15 as shown in FIG. 6. Monitor framing device 10 may be securely attached to chassis 12 through use of adhesive items 12A which can be placed at strategic attachment locations and which are velcro or other means of attaching.

Once the three sections 16, 18, 19 are assembled to monitor 11 in the position shown in FIG. 6, adhesive tabs 31 are stripped of release liners 46 (see FIG. 5). In order to form the seams 27, 29 the bottom lower horizontal section 17 can be added using adhesivetabs 40, 41.

As shown in FIG. 6, a user can then attach one or more panels 50. Each panel 50 provides a clip 51 for holding papers, photographs, documents, etc. The clipboard 50 includes a panel 52 that is secured to a selected plurality of slots 42 with blocking tabs 58. The rear surface of panel 52 can be provided with an attachment panel 53 such as a hook and loop type attachment panel. The rear surface of. blocking tabs 58 can be reinforced with an adhesive material such as tape.. Diagonal strut 54 has end portions 56, 57 but also provide corresponding hook/loop fasteners. The diagonal'strut 54 can thus be attached at end portion to attachment panel 53 and at end portion 57 to an attachment panel 55 that is provided on monitor chassis 12 and/or monitor's side frame panel 22 and/or 24. In FIG. 6, the attachment panels 54 can be provided on both left and right sides of monitor chassis 12 so that panels 50 can be attached to slots 42 on either or both sides of monitor chassis 12. Both panels 50 can function as clip boards, or can fold in to form a dust cover that covers screen 14. In FIG. 6, arrow 59 illustrates the attachment of clipboard 50 to slots 42 on the right side of monitor 11. Arrow 60 illustrates that panel 50 can be adjusted in its angular orientation about a generally inclined or vertical axis by moving the position of end portion 56 of diagonal strut 54 to a selected position along attachment panel 53.

Figure 7:
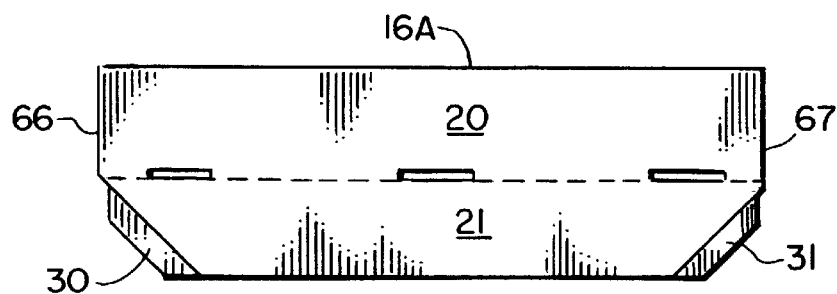
FIGS. 7, 8, 9, and 10 are partial views of an alternative embodiment of the apparatus of the present invention.
Figures 8, 9:
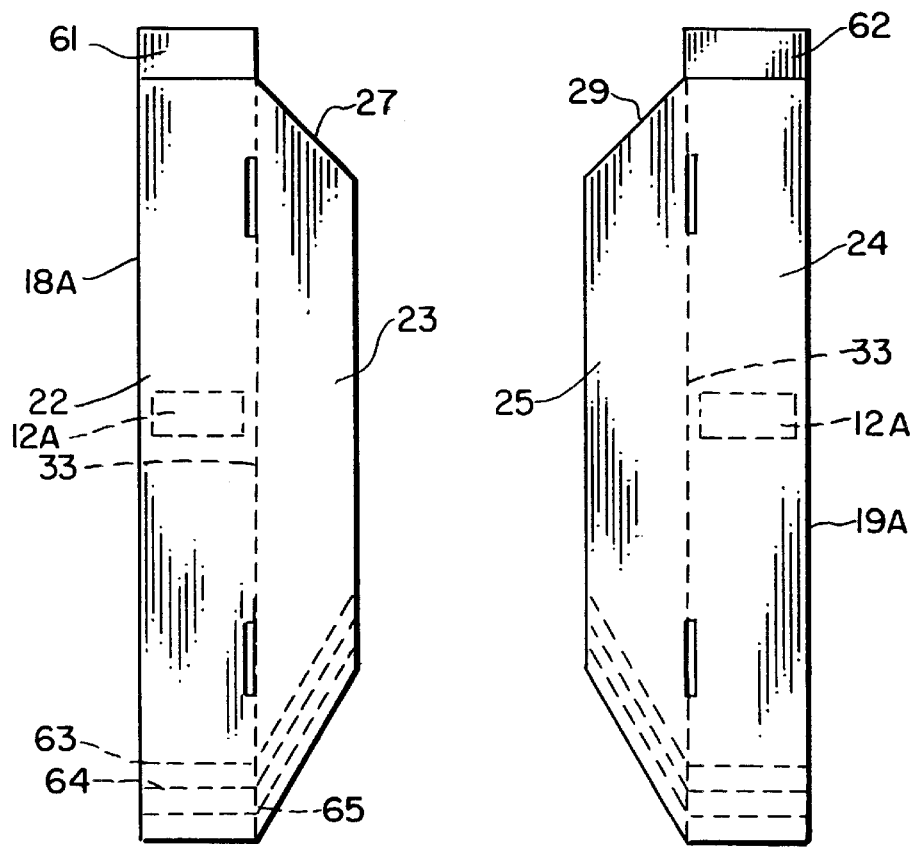
Figure 10:
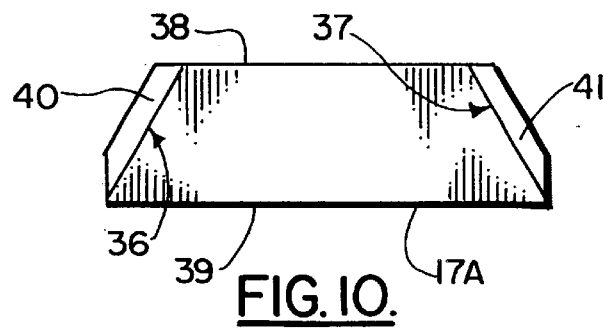

An alternate embodiment of the apparatus of the present invention is shown in FIGS. 7, 8 and 9. In FIGS. 7, 8 and 9, upper horizontal section 16A, left side section 18A, right section 19A, and lower horizontal section 17A are separate sections that are separately attachable to monitor 11. Each of the sections 18A. 19A provides adhesive tabs 61, 62 that attach to the upper horizontal section 16A at end portions 66, 67 respectively. Otherwise, the adhesive tabs 30, 31 attach to panels 23, 25 respectively at mitered edges 27, 29 as with the preferred embodiment. Cut or score lines 63, 64; 65 enable a user to trim each of the sections 18A, 19A in order to fit a particular monitor 11 of a particular size. The embodiment of FIGS. 7, 8, and 9 also employ a bottom section 17A (see FIG. 10) that is affixed to the side sections 18A, 19A.

The following is a list of parts and materials suitable for use in the present invention:

| PARTS LIST | |
|---|---|
| NUMBER | DESCRIPTION |
| 10 | monitor framing device |
| 11 | monitor |
| 12 | chassis |
| 12A | attachment means (such as velcro or other means) |
| 13 | foot |
| 14 | screen |
| 15 | front face |
| 15A | inner portion |
| 16 | upper horizontal section |
| 17 | lower horizontal section |
| 18 | left side section |
| 19 | right side section |
| 20 | horizontal top panel |
| 21 | inclined front panel |
| 22 | side panel |
| 23 | front panel |
| 24 | side panel |
| 25 | front panel |
| 26 | fold |
| 27 | seam |
| 28 | fold |
| 29 | seam |
| 30 | adhesive tab |
| 31 | adhesive tab |
| 32 | fold |
| 33 | fold |
| 34 | mitered edge |
| 35 | mitered edge |
| 36 | mitered edge |
| 37 | mitered edge |
| 38 | upper edge |
| 39 | lower edge |
| 40 | adhesive tab |
| 41 | adhesive tab |
| 42 | slot |
| 43 | arrow |
| 44 | arrow |
| 45 | arrow |
| 46 | release liner |
| 49 | score for clipboard |
| 50 | clipboard |
| 51 | clip |
| 52 | panel |
| 53 | attachment panel |
| 54 | diagonal strut |
| 55 | attachment panel |
| 56 | end portion |
| 57 | end portion |
| 58 | locking tab |
| 59 | arrow |
| 60 | arrow |
| 61 | adhesive tab |
| 62 | adhesive tab |
| 63 | cut line |
| 64 | cut line |
| 65 | cut line |

The foregoing embodiments are presented by way of example only; the scope of the present invention is to be limited only by the following claims.

What is claimed is:

1. A monitor framing apparatus for decorating a monitor that includes a screen surrounded by a front face portion of the monitor, comprising:
   a) a plurality of frame sections, including top and left and right side sections and a bottom section, at least some of the sections having a pair of panels connected at a fold, one of the panels of each pair being a panel that registers against and covers at least a portion of the front face portion of the monitor;
   b) a plurality of attachments on at least one of the frame sections; and
   c) a clip board panel that attaches to the frame section at the attachments.

2. The monitor framing apparatus of claim 1 wherein there are attachments on a plurality of frame sections.

3. The monitor framing apparatus of claim 1 wherein the sections include left and right sections and there are attachments on both the left and right sections.

4. The monitor framing apparatus of claim 1 wherein the attachments are comprised of slotted portions and the clip board panel has tabbed portions that fit into the slots for securing the clip board panel to the sections.

5. The monitor framing apparatus of claim 1 wherein some of the sections removably attach to other of the sections during assembly of the apparatus to a selected monitor.

6. The monitor framing apparatus of claim 1 wherein some of the sections have adhesive tab portions that enable them to removably attach to other of the sections during assembly of the apparatus to a selected monitor.

7. The monitor framing apparatus of claim 1 wherein at least some of the sections have cut lines thereon for enabling them to be trimmed to a selected size for fitting to the size of a selected monitor.

8. The monitor framing apparatus of claim 1 wherein some of the sections are collapsible to a flat panel that can be shipped in a flat envelope.

9. The monitor framing apparatus of claim 1 wherein all of the sections are collapsible to a flat panel that can be shipped in a flat envelope.

10. The monitor framing apparatus of claim 1 wherein the clip board panel is adjustably movable once attached to the section about an inclined axis.

11. A monitor framing apparatus for decorating a computer monitor that has a screen surrounded by front face and side portions of the monitor, comprising:
   a) a plurality of frame sections, including top and left and right side sections and a bottom section, at least some of the sections having a pair of panels connected at a fold, one of the panels of each pair being a panel that registers against and covers at least a portion of the front face and side portions of the monitor;
   b) a plurality of attachments on at least one of the frame sections; and
   c) a panel that removably attaches to at least one frame section at the attachments.

12. The monitor framing apparatus of claim 11 wherein there are attachments on a plurality of frame sections.

13. The monitor framing apparatus of claim 11 wherein the sections include left and right sections and there are attachments on both the left and right sections, and further comprising a second panel.

14. The monitor framing apparatus of claim 13 wherein the panel is adjustably movable once attached to the section about an inclined axis.

15. The monitor framing apparatus of claim 14 wherein the two panels define a dust cover for the screen.

16. The monitor framing apparatus of claim 11 wherein the attachments are comprised of slotted portions and the panel has tabbed portions that fit into the slots for securing the panel to the sections.

17. The monitor framing apparatus of claim 11 wherein a bottom frame section removably attach to other of the sections during assembly of the apparatus to a selected monitor.

18. The monitor framing apparatus of claim 11 wherein some of the sections have adhesive tab portions that enable them to removably attach to other of the sections during assembly of the apparatus to a selected monitor.

19. The monitor framing apparatus of claim 11 wherein at least some of the sections have cut lines thereon for enabling them to be trimmed to a selected size for fitting to the size of a selected monitor.

20. The monitor framing apparatus of claim 11 wherein some of the sections are collapsible to a flat panel that can be shipped in a flat envelope.

21. The monitor framing apparatus of claim 11 wherein all of the sections are collapsible to a flat panel that can be shipped in a flat envelope.

22. The monitor framing apparatus of claim 11 wherein the panel is adjustably movable once attached to the section about an inclined axis.

23. A monitor framing apparatus, for decorating a monitor that includes a screen surrounded by a front face portion of the monitor, comprising:
   a) a plurality of frame sections, including top and left and right side sections and a bottom section, the top and side sections each having a pair of panels connected at a tab, one of the panels of each pair being a panel that registers against and covers at least a portion of the front face portion of the monitor;
   b) a plurality of attachments on at least one of the frame sections; and
   c) a clip board panel that attaches to the frame section at the attachments.

24. The monitor framing apparatus of claim 23 wherein there are attachments on a plurality of frame sections.

25. The monitor framing apparatus of claim 23 wherein the sections include left and right sections and there are attachments on both the left and right sections.

26. The monitor framing apparatus of claim 23 wherein the attachments are comprised of slotted portions and the clip board panel has tabbed portions that fit into the slots for securing the clip board panel to the sections.

27. The monitor framing apparatus of claim 23 wherein some of the sections removably attach to other of the sections during assembly of the apparatus to a selected monitor.

28. The monitor framing apparatus of claim 23 wherein some of the sections have adhesive tab portions that enable them to removably attach to other of the sections during assembly of the apparatus to a selected monitor.

29. The monitor framing apparatus of claim 23 wherein at least some of the sections have cut lines thereon for enabling them to be trimmed to a selected size for fitting to the size of a selected monitor.

30. The monitor framing apparatus of claim 23 wherein some of the sections are collapsible to a flat panel that can be shipped in a flat envelope.

31. The monitor framing apparatus of claim 23 wherein all of the sections are collapsible to a flat panel that can be shipped in a flat envelope.

32. The monitor framing apparatus of claim 23 wherein the clip board panel is adjustably movable once attached to the section about an inclined axis.

* * * * *